US012039588B2

(12) United States Patent
Ogden et al.

(10) Patent No.: US 12,039,588 B2
(45) Date of Patent: Jul. 16, 2024

(54) SYSTEMS AND METHODS FOR DETECTION OF NAVIGATION TO PHYSICAL VENUE AND SUGGESTION OF ALTERNATIVE ACTIONS

(71) Applicant: Google LLC, Mountain View, CA (US)

(72) Inventors: Scott James Ogden, Chippendale (AU); Cayden Meyer, Forest Lodge (AU)

(73) Assignee: GOOGLE LLC, Mountain View, CA (US)

( * ) Notice: Subject to any disclaimer, the term of this patent is extended or adjusted under 35 U.S.C. 154(b) by 673 days.

(21) Appl. No.: 16/822,862

(22) Filed: Mar. 18, 2020

(65) Prior Publication Data

US 2020/0219175 A1  Jul. 9, 2020

Related U.S. Application Data

(63) Continuation of application No. 15/236,715, filed on Aug. 15, 2016, now Pat. No. 10,664,899.

(51) Int. Cl.
*G06Q 30/0601* (2023.01)
*G01C 21/34* (2006.01)
(Continued)

(52) U.S. Cl.
CPC ..... *G06Q 30/0639* (2013.01); *G01C 21/3484* (2013.01); *G01C 21/3697* (2013.01);
(Continued)

(58) Field of Classification Search
None
See application file for complete search history.

(56) References Cited

U.S. PATENT DOCUMENTS

| 7,020,623 | B1 | 3/2006 | Tiley et al. |
| 7,020,625 | B2 | 3/2006 | Tiley et al. |

(Continued)

FOREIGN PATENT DOCUMENTS

| CN | 102413231 | 4/2012 |
| CN | 105606109 | 5/2016 |

(Continued)

OTHER PUBLICATIONS

Text of U.S. Pat. No. 10,546,326 B2 (Year: 2020).*
(Continued)

*Primary Examiner* — Michelle T Kringen
(74) *Attorney, Agent, or Firm* — DORITY & MANNING P.A.

(57) ABSTRACT

The techniques, methods, systems, and other mechanisms described herein include processes for determining if customized content should be generated, what information to include in the customized content, and when to provide the customized content. In general, a computing system determines that a user intends to travel to a physical venue. The computing system can determine if an entity associated with the physical venue has a web page. The computing system can determine various aspects of a predicted route of travel from the user's present location to the physical venue. The computing system can use location information indicating the user's current location and determine one or more routes of travel to the physical venue. The computing system can compare one or more determined aspects of the predicted route to threshold values to determine if customized content should be generated and presented to the user.

20 Claims, 6 Drawing Sheets

(51) Int. Cl.
*G01C 21/36* (2006.01)
*G06Q 30/0251* (2023.01)
*H04L 67/02* (2022.01)
*H04W 4/02* (2018.01)

(52) U.S. Cl.
CPC ..... *G06Q 30/0259* (2013.01); *G06Q 30/0261* (2013.01); *H04L 67/02* (2013.01); *H04W 4/023* (2013.01)

(56) References Cited

U.S. PATENT DOCUMENTS

| | | | |
|---|---|---|---|
| 7,080,018 | B1 | 7/2006 | Fox et al. |
| 7,577,244 | B2 | 8/2009 | Taschereau |
| 8,533,761 | B1 | 9/2013 | Sahami et al. |
| 8,892,549 | B1 | 11/2014 | Thakur |
| 9,002,730 | B2 | 4/2015 | Postrel |
| 10,546,326 | B2 * | 1/2020 | Publicover ........ G06F 16/24575 |
| 2008/0154696 | A1 | 6/2008 | Spiegelman et al. |
| 2008/0214157 | A1 | 9/2008 | Ramer et al. |
| 2010/0088179 | A1 | 4/2010 | Desai et al. |
| 2010/0262456 | A1 | 10/2010 | Feng et al. |
| 2011/0071924 | A1 | 3/2011 | Desmond |
| 2013/0080212 | A1 | 3/2013 | Li et al. |
| 2013/0088515 | A1 * | 4/2013 | Choi ...................... G06T 19/006 345/633 |
| 2013/0345961 | A1 | 12/2013 | Leader et al. |
| 2013/0346237 | A1 | 12/2013 | Rademaker |
| 2014/0121967 | A1 | 5/2014 | Anbalagan |
| 2014/0278031 | A1 * | 9/2014 | Scofield ............. G01C 21/3461 701/118 |
| 2016/0223343 | A1 * | 8/2016 | Averbuch ............... B60W 50/14 |
| 2017/0161450 | A1 * | 6/2017 | White .................... G16H 40/67 |
| 2017/0268892 | A1 | 9/2017 | Singh |
| 2017/0316456 | A1 | 11/2017 | Licht |

FOREIGN PATENT DOCUMENTS

| | | |
|---|---|---|
| WO | WO 2009/155375 | 12/2009 |
| WO | WO 2013/126763 | 8/2013 |
| WO | WO 2015/073567 | 5/2015 |
| WO | WO 2015/134364 | 9/2015 |

OTHER PUBLICATIONS

D. Kwak, D. Kim, R. Liu, B. Nath and L. Iftode, "DoppelDriver: Counterfactual actual travel times for alternative routes," 2015 IEEE International Conference on Pervasive Computing and Communications (PerCom), St. Louis, MO, USA, 2015, pp. 178-185, doi: 10.1109/PERCOM.2015.7146525 (Year: 2015).*
CN Office Action in Chinese Appln. No. 201780059690, dated Jul. 14, 2021, 13 pages (with English translation).
Search Report in Chinese Appln. No. 201780059690, dated Jul. 9, 2021, 2 pages.
International Search Report and Written Opinion issued in International Application No. PCT/US2017/042847, mailed on Sep. 8, 2017, 13 pages.
Office Action issued in British Application No. 1712629.3, mailed on Jan. 23, 2018, 7 pages.
Pan, Xing, Venkatesh Shankar, and Brian T. Ratchford. "Price competition between pure play versus bricks-and-clicks e-tailers: Analytical model and empirical analysis." The economics of the internet and e-commerce. Emerald Group Publishing Limited, 2002. 29-61 (Year: 2002).
PCT International Preliminary Report on Patentability issued in International Application No. PCT/US2017/042847, mailed on Feb. 28, 2019, 8 pages.
Written Opinion issued in International Application No. PCT/uS2017/042847, mailed on Jul. 30, 2018, 8 pages.
IN Office Action in Indian Application No. 201927003178, dated Feb. 15, 2021, 6 pages (with English translation).
EP Office Action in European Application No. 17746281.9, dated Feb. 9, 2021, 8 pages.

* cited by examiner

SYSTEMS AND METHODS FOR DETECTION OF NAVIGATION TO PHYSICAL VENUE AND SUGGESTION OF ALTERNATIVE ACTIONS

CROSS-REFERENCE TO RELATED APPLICATIONS

This application is a continuation of and claims priority to U.S. application Ser. No. 15/236,715, filed on Aug. 15, 2016, the entire contents of which are hereby incorporated by reference.

TECHNICAL FIELD

This document generally relates to generating and providing custom content to mobile device users.

BACKGROUND

The Internet facilitates the exchange of information between users across the globe. This exchange of information enables content item providers to provide content to a variety of users. A content item provider can control the distribution of their content items (e.g., text, image files, audio files, video files, or other content items) based on various factors relating to users. Content item providers can identify users who may be interested in particular content based on past detected or expressed interests of the user.

SUMMARY

This document describes techniques, methods, systems, and other mechanisms for generating customized content for a user of a mobile computing device based on predicted future actions of the user. The techniques, methods, systems, and other mechanisms described herein include processes for determining if customized content should be generated, what information to include in the customized content, and when to provide the customized content. In general, a computing system determines that a user intends to travel to a physical venue. The computing system can determine if an entity that owns or is otherwise associated with the physical venue has a web page. In addition or alternatively, the computing system can identify a website that offers similar or the same products as the physical venue. The computing system can determine various aspects of a predicted route of travel from the user's present location to the physical venue. The computing system can use location information indicating the user's current location, such as GPS signals received by the user's mobile device, and determine one or more routes of travel to the physical venue. The computing system can, for example, determine an estimated travel time to the physical venue, an estimated mode(s) of transportation to the physical venue, estimated cost of traveling to the physical venue, weather conditions along all or part of a predicted route to the physical venue, or other predicted or estimated factors related to travel from the users present location to the physical venue.

The computing system can compare one or more determined aspects of the predicted route to threshold values to determine if customized content should be generated and presented to the user. For example, if the computing system can determine that customized content should be generated and presented to the user if the estimated travel time to the physical venue is greater than thirty minutes. The computing system can generate customized content for presentation to the user. The customized content can include, for example, the estimated travel time to the physical venue, the estimated cost of traveling to the physical venue, and a suggestion to visit a website rather than traveling to the physical venue. The customized content can also include information on products or services that can be purchased through the website that may be of interest to the user. The customized content can also include information on the estimated savings in time (or money) by obtaining products or services from the website.

In general, one innovative aspect of the subject matter described in this specification can be embodied in a computing device having a memory storing data and instructions and one or more processors that execute instructions stored on the memory. The instructions can cause the one or more processors to execute instructions the perform actions including receiving, at a computing system and from a mobile computing device, first location information indicating a first location of the mobile computing device; receiving, at the computing system and from the mobile computing device, information indicating that a user of the mobile computing device intends to travel to a physical venue; receiving, at the computing system and from the mobile computing device, second location information indicating a second location of the mobile computing device; analyzing the received first and second location information to determine that the mobile computing device has begun to travel toward the physical venue; determining an estimated travel time from the first or second location of the mobile computing device to the physical venue; comparing the estimated travel time to a determined criteria to determine if the estimated travel time satisfies the determined criteria; identifying a webpage associated with the physical venue; responsive to (a) determining that the mobile computing device has begun to travel toward the physical venue, (b) determining that the estimated travel time satisfies the determined criteria, and (c) identifying the webpage associated with the physical venue, generating display information for presentation to the user at the mobile computing device, the display information including an indication of the estimated travel time and a selectable link that, when selected, directs the user to the webpage; and transmitting, by the computing system, the display information to the mobile computing device for presentation to the user as part of a map display.

These and other embodiments can each optionally include one or more of the following features. The actions can further include accessing historic user activity information for the user; determining, using the historic user activity information for the user, an average travel time for trips taken by the user; and setting the determined average travel time as the determined criteria prior to comparing the estimated travel time to the determined criteria. The actions can further include accessing historic user activity information for the user; determining, using the historic user activity information for the user, an average travel time range for trips taken by the user; and setting the maximum value of the determined average travel time range as the determined criteria prior to comparing the estimated travel time to the determined criteria. The determined criteria can be a travel time threshold value determined based on historic user activity information, including information on past trips taken by the user. The determined criteria can be a travel time threshold value that is determined based on user preference information provided by the user.

In general, another innovative aspect of the subject matter described in this specification can be embodied in a computing device having a memory storing data and instructions and one or more processors that execute instructions stored on the memory. The instructions can cause the one or more processors to perform actions including receiving, at a computing system and from a mobile computing device location information indicating a location of the mobile computing device; receiving, at the computing system and from the mobile computing device, information indicating that a user of the mobile computing device intends to travel to a physical venue; determining a predicted travel route to the physical venue from the location of the mobile computing device; calculating a quantitative value of the predicted travel route to the physical venue; comparing the quantitative value of the predicted travel route to a determined criteria to determine if the quantitative value of the predicted travel route satisfies the determined criteria; identifying a webpage associated with the physical venue; responsive to determining that the quantitative value of the predicted travel route satisfies the determined criteria and identifying the webpage associated with the physical venue, generating display information for presentation to the user at the mobile computing device, the display information including a network address for the webpage; and transmitting, by the computing system, the display information to the mobile computing device for presentation to the user.

These and other embodiments can each optionally include one or more of the following features. The quantitative value of the predicted travel route can be an estimated travel cost for the predicted travel route. The actions can further include identifying one or more items of interest available for purchase at both the physical venue and through the webpage; identifying an estimated shipping cost for delivery of the one or more items of interest when purchased through the webpage; and setting the estimated shipping cost as the determined criteria prior to comparing the quantitative value of the predicted travel route to the determined criteria. The display information can include the estimated travel cost and the estimated shipping cost. The display information can include a cost different between the estimated travel cost and the estimated shipping cost. Calculating the quantitative value of the predicted travel route to the physical venue can include identifying an estimated cost of taking public transit to the physical venue. Determining the predicted travel route to the physical venue from the location of the mobile computing device can include identifying a preferred mode of travel for the user; and performing a route calculation to determine a fastest travel route that predominantly relies on the identified preferred mode of travel for the user. The quantitative value of the predicted travel route can be an estimated travel distance for the predicted travel route. The actions can further include: accessing historic user activity information for the user; determining, using the historic user activity information for the user, a preferred maximum travel distance for the user; and setting the preferred maximum travel distance of the user as the determined criteria prior to comparing the quantitative value of the predicted travel route to the determined criteria. Determining the preferred maximum travel distance for the user can include identifying a mode of travel for the predicted travel route and determining the preferred maximum travel distance for the user based on the mode of travel for the predicted travel route. The display information can include the estimated travel distance. The quantitative value of the predicted travel route can be an estimated travel time for the predicted travel route. The display information can include the estimated travel time for the predicted travel route. The display information can include an estimated delivery time for items purchased from the webpage.

Particular implementations can, in certain instances, realize one or more of the following advantages. Computer memory storage resources can be preserved by generating custom content for users only when one or more objective criteria have been satisfied to indicate that generation and presentation of such custom content is appropriate. This saves memory resources over systems that generate customized content for all users or network participants and store such content for later presentation. Communication network bandwidth usage can be reduced by only transmitting customized content when one or more objective criteria have been satisfied to indicate that transmission and presentation of such custom content is appropriate. This saves communication network resources over systems that transmit and present content to all users or to a large number of users any time the users are engaging with a client computing device. Such reduction of computer memory storage resources and communication of network resources can increase the scalability of a custom content generation and presentation system to allow the system to be utilized by a larger number of clients on a larger number of client devices without the need to increase communication network bandwidth or increase computer memory storage capacity (e.g., a custom content generation and presentation system such as that described herein reduces the need to build additional physical communication infrastructure or to build additional server farms for storage of customized content to provide service to additional users).

Demand on physical transportation infrastructure can be reduced by allowing users to avoid traveling to physical store locations. Reduced travel by users can lead to reduced traffic congestion and can alleviate crowding on public transportation systems such as bus and rail transportation networks. Additionally, users can save time by avoiding travel to physical venues under less than ideal conditions, thereby freeing up time to pursue other productive activities.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes a system for providing custom content to a user of a computing device. In particular, the custom content can include information on one or more aspects or details of a predicted travel route between a current location of the computing device and a physical venue. The physical venue can be, for example, a physical venue that the user has searched for using a mapping application on the computing device. The custom content can include, for example, include information on a travel time to the physical venue, a travel distance to the physical venue, a travel cost to reach the physical venue, traffic conditions along a route to the physical venue, weather conditions along the route to the physical venue, or other information related to the predicted travel route to the physical venue or the geographic area near the physical venue. The custom information can include a suggestion to the user to visit a webpage for an entity associated with the physical venue rather than traveling to the physical venue. In some implementations, the system for providing custom content only generates and presents custom content to the user if one or more threshold criteria have been met. For example, a server can determine if the estimated travel time to the physical venue from the user's current location exceeds a threshold value and only generate and provide custom content to the user if the estimated travel time exceeds the threshold value.

Figure 1B:
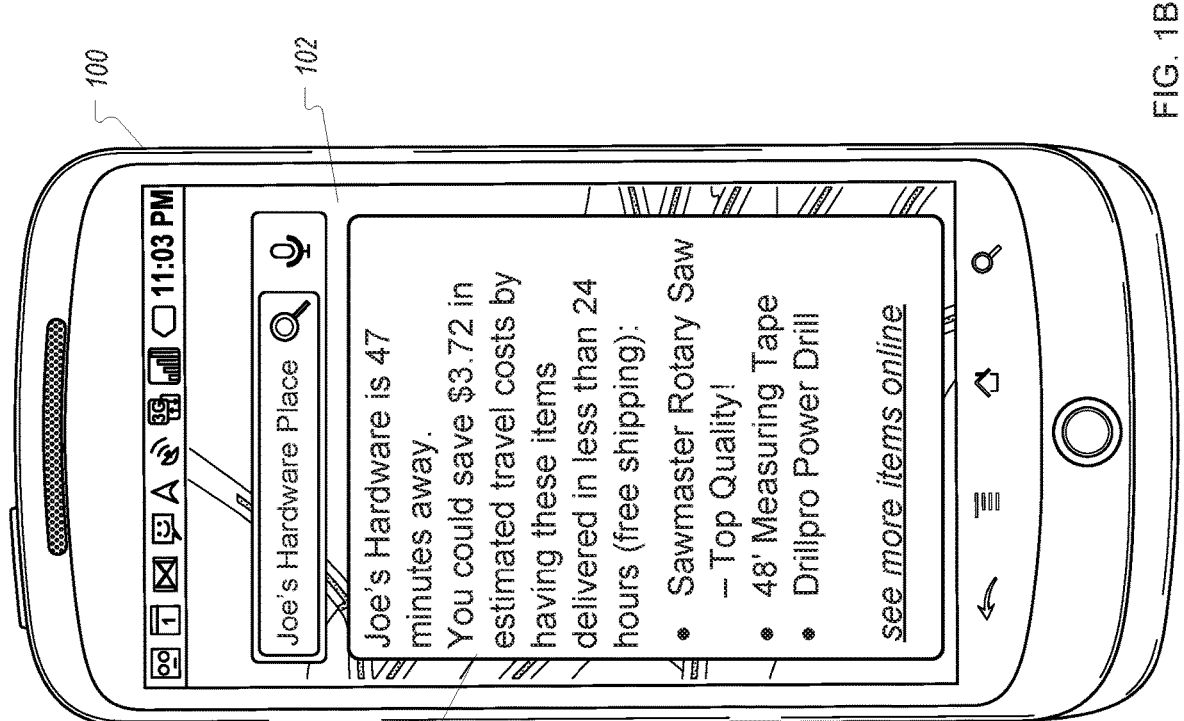
FIGS. 1A-1B are conceptual diagrams showing the presentation of a customized content display in response to information received at a mobile computing device.
Figure 1A:
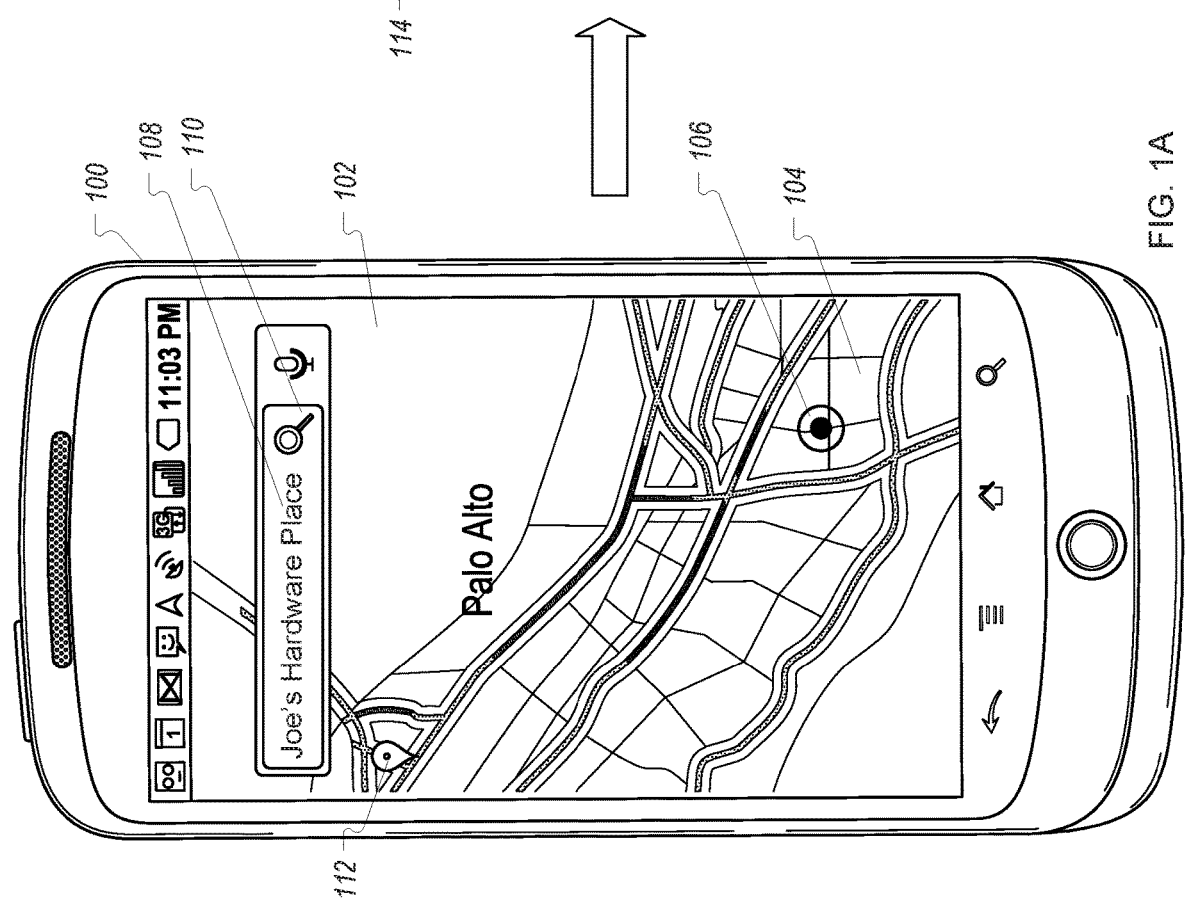

Turning to FIG. 1A, a computing device 100 can be a mobile phone as shown in the example in FIGS. 1A-1B. In other implementations, the computing device 100 can be a personal digital assistant, a tablet, a smart watch, a laptop computer, a net book, a desktop computer, a camera, or another type of electronic computing device. The computing device 100 includes a display 102 for displaying information to a user. In some implementations, the display 102 can be a touchscreen for receiving user input. In some implementations, the computing device 100 can include one or more keys (such as, for example, a keyboard) or actionable buttons for receiving user input. The mobile computing device 100 can also include one or more location detection modules for receiving location information and processing the received location information to determine a location of the computing device 100. For example, the mobile computing device 100 can include a GPS unit, a dead reckoning location determination unit, or a location determination module that relies on radio signal triangulation (e.g., based on signals received from cellular communication towers).

In the example shown in FIGS. 1A-1B, the computing device 100 is executing a mapping application that causes the computing device 100 to provide a map display 104 on the display 102. The map display 104 shows various roads, bodies of water, and other geographic features in an area around the location of the computing device 100. A location indicator 106 shows the location of the computing device 100 on the map display 104 relative to other geographic features depicted by the map display 104.

In some implementations, the computing device 100 can receive inputs from one or more input devices incorporated as part of or in operative communication with the computing device 100 and a computing system that includes the computing device 100 can process the inputs to determine that the user of the computing device 100 intends to travel to a particular physical location or geographic area. For example, the computing device 100 can use received inputs and other information to determine that the user likely intends to travel to a physical store location, a physical restaurant location, another type of physical business location, a recreational location (e.g., beach, park, jogging path, hiking trail, etc.), a shopping district, a night life district, or other particular geographic area or location.

In the example shown in FIG. 1A, the user has entered a search query 108 into a map search query field 110. In this example, the search query 108 is for a hardware store called "Joe's Hardware Place." The user can enter the search query 108, for example, using touch screen functionality of the display 102 to select keys of a keyboard (not shown) displayed on the display 102 to enter the search query 108. As another example, the user can use physical keys incorporated as part of the computing device 100 or in operative communication with the computing device 100 to enter the search query 108. In some implementations, results for the entered search query 108 are stored in a cache in memory of the computing device 100. The computing device 100 can access the cache to identify one or more results for the search query 108. In other implementations, the computing device 100 resolves the query by contacting a remote server (e.g., by connecting to a wireless communication network as explained in more detail with respect to FIG. 2). The remote server can provide results for the search query. The mapping application running on the computing device 100 can display one or more of the search results for the search query 108 on the map display 104. In the example shown, the mapping application shows a location icon 112 on the map display 104 to show a location of a business that matches the search query 108. In this example, the location icon 112 shows the location of Joe's Hardware Place.

When the user enters the search query 108 into the map search query field 110, the a computing system that includes the computing device 100 can use this input to determine that the user intends to travel to Joe's Hardware Place sometime in the near future. As another example, the user can enter a search query 108 of "hardware stores." The computing device 100 can use this input to identify a hardware store that is a shortest distance from, or a shortest travel time from the current location of the computing device 100 and use this information to determine that the user is likely to head to the identified hardware store sometime in the near feature. Other forms of input can also be used to determine that a user intends to travel to a particular physical location or geographic area. For example, the computing system that includes the computing device 100 can track user actions to determine patterns or to predict potential future activities of the user.

In one example, the computing system that includes the computing device 100 can use position information received by the computing device 100 (e.g., GPS signals received by a GPS device of the computing device 100) to identify various locations of the computing device 100 over time. The computing system can analyze this collected data to, for example, determine that user visits a particular pharmacy on the way home from work every Tuesday between 5:30 pm and 6:00 pm. The computing device 100 can use this information to determine that that the user is likely to travel to the identified pharmacy in the near future if the current time is 5:00 pm on a Tuesday.

As another example, the computing device 100 can use received position information (e.g., GPS signals) to determine that the computing device 100 is moving in a particular direction from a particular starting point. For example, the user of the computing device 100 may be traveling westward starting from the user's place of work. The computing system that includes the computing device 100 can use this information in combination with historical activity information for the user to determine that in general, when the user travels in a westward direction starting at the user's work, the user is generally traveling to a particular shopping district (e.g., an area with a number of retail stores, a mall, a strip mall, etc.). The computing system can use this historic information along with the information on the user's current direction of travel to predict that the user intends to head to the particular shopping district. In some instances, the computing system can rely on other information rather than historic information for the user when predicting that the user intends to travel to a particular physical location or geographic area. For example, the computing device 100 can identify the current position and travel direction of the computing device 100 and the computing system can determine that in general, persons traveling in the identified direction at the identified location are traveling toward a particular physical location or geographic area (e.g., such as a large shopping mall, or a popular recreation area).

In some implementations, in response to determining that the user likely intends to travel to a particular location or geographic area in the near future, the computing device 100 can provide one or more suggestions to the user of the computing device 100 for actions or activities the user can take instead of traveling to the particular location or geographic area. For example, in the example shown in FIG. 1B, the computing device 100 provides a suggestion 114 on the display 102 (overlaid on the map display 104) that recommends to the user to visit an online store to purchase various hardware items rather than traveling to the Joe's Hardware Place physical store location. In some implementations, the suggestion 114 is generated by a remote computing system. In some implementations, information included in the suggestion 114 is generated and/or provided by a remote computing system and configured for display by the computing device 100. As will be discussed in greater detail below, in some implementations, the suggestion 114 includes customized content that is generated to reflect aspects of the user's or computing device 100's current situation (such as location, time of day, historical information on user preferences, etc.).

In some implementations, the suggestion 114 is not displayed automatically in response to determining that the user intends to travel to the identified physical location or geographic location. For example, a computing system that includes the computing device 100 may determine that one or more determined criteria are satisfied prior to presenting the suggestion 114 to the user. If the one or more determined criteria are not satisfied, the computing device 100 does not provide the suggestion 114 to the user. In some implementations, the determination as to whether or not the one or more determined criteria are satisfied is made by one or more remote computing systems rather than (or in conjunction with) the computing device 100.

As a first example, the computing system can determine whether or not a retailer associated with a particular physical location has an associated online store. For example, the computing system that includes the computing device 100 can determine that the user intends to travel to Joe's Hardware Place based on the search query 108 entered by the user into the mapping application. The computing system can determine if Joe's Hardware Place has an online store where the user can purchase certain items online rather than traveling to the physical store location for Joe's Hardware Place. In some implementations, the suggestion 114 is only generated and displayed by the computing system if Joe's Hardware Place has an associated online store. In some implementations, if Joe's Hardware Place does not have an associated online store, the computing system can identify one or more other online stores that sell products similar to those available at Joe's Hardware Place's physical store location. For example, the computing system can identify online stores for Bill's Hardware Palace and Susan's Hardware Emporium and determine that the two identified online stores sell products that are similar to products available at Joe's Hardware Place. The computing system can determine that the suggestion 114 should only be presented to the user if an online store selling similar products to the identified physical store location can be identified. If such an online store can be identified, the computing system provides the suggestion 114. In some implementations, the suggestion 114 can include suggestions relating to the online store for Joe's Hardware Place as well as online stores for other similar or related stores.

In some implementations, the computing system can determine various aspects of a travel route to the physical store location. The determined aspects of the travel route can be compared to criteria to determine if the determined aspects satisfy the criteria. For example, upon determining that the user of the computing device 100 intends to travel to Joe's Hardware Place in the near future, the computing system that includes the computing device 100 can determine one or more routes from a current location of the computing device 100 to the physical store location for Joe's Hardware Place (i.e., a route between the location indicator 106 and the location icon 112 shown on the map display 104). This can be performed by the mapping application running on the computing device 100, or by a remote computing system. The computing system that includes the computing device 100 can determine various aspects of one or more predicted routes of travel from the user's location to the physical store location. For example, the computing system can determine an estimated travel time to the physical store location, an estimated travel distance, an estimated travel cost (e.g., based on route distance, price of gasoline, estimated fuel economy of a vehicle, based on estimated parking fees, and/or based on public transportation fares), traffic conditions along all or a portion of the route, weather conditions along all or a portion of the route, one or more modes of transportation for the route, direction(s) of travel for the route, proximity of one or more portions of the route to another identified location (e.g., the user's home), or other factors associated with the travel route. In some implementations, the estimated travel time, distance, cost, traffic, or weather for the route can be identified based on a round trip, or on a trip from the user's current location, to the physical store location, and to a third location (e.g., the user's home address). In some implementations, the computing system makes such determinations for multiple different routes. For example, the computing system can identify two driving routes, one bus route, one train route, and one bike route to the identified physical store location. The computing system can determine aspects of each of the identified predicted routes to the physical store location.

The computing system can compare aspects of the one or more predicted travel routes to the physical store location to criteria to determine if the criteria have been satisfied. In some implementations, the suggestion 114 is presented to the user in response to the computing system determining that one or more criteria have been satisfied. In some implementations, the criteria can be pre-set values. In some implementations, the criteria can be criteria or values determined from information received by the computing system.

In a first example, the computing system can predict a likely route of travel of the user from the current location of the computing device 100 to the physical store location of Joe's Hardware Place. In this example, the computing system can use historical information on the user's preferred mode of transportation when predicting the route of travel.

For example, the computing system can identify that Joe's Hardware Place is over half a mile away and that the user prefers to drive to locations more than a half mile away. As another example, the computing system can access historical information indicating that the user prefers to use public transportation when a destination is within half a mile of a public transportation stop, determine Joe's Hardware Place is less than a half mile from a public transportation stop, and identify a public transportation route to Joe's Hardware Place. As yet another example, the computing system can analyze past behavior of the user to determine that the user prefers to use ride sharing services when a destination is greater than a mile from a public transportation stop. The computing system can determine that Joe's Hardware Place is greater than a mile from the closest public transportation stop and determine a predicted ride share travel route from the computing device 100's current location to physical store location for Joe's Hardware Place. In some implementations, the user can indicate a mode of transportation by entering user input into the computing device 100. For example, the mapping application can allow the user to select from driving directions, public transit directions, walking directions, biking directions, or offer a ride share option.

Continuing with the above first example, upon determining a predicted route from the user's current location to Joe's Hardware Place that utilizes one or more determined modes of transportation, the computing system estimates a travel time for the predicted route. The computing system then compares the estimated travel time to a travel time threshold value to determine if the estimated travel time exceeds the travel time threshold. The travel time threshold value can be a preset value (e.g., 30 minutes). The travel time threshold value can also be a user set value. For example, the computing system can present the user with a user interface that allows the user to select a threshold travel time value. The user can select the threshold travel time value prior to the computing system predicting that the user intends to travel to a particular location or geographic area. In some implementations, the threshold value can be determined based on observed user preferences. For example, the threshold can be set higher for a person that regularly drives for 2 hour stretches than for a person who generally avoids trips longer than 20 minutes. As another example, the threshold value could be an average of travel times for trips taken by the user over an historical time period, or based on an average of travel times for trips taken by the user plus a weighting factor. The computing system can determine that the suggestion 114 should be generated, transmitted to the computing device 100, and displayed in response to the computing system determining that the estimated travel time exceeds the travel time threshold value. If the estimated travel time does not exceed the estimated travel time threshold value, the suggestion 114 is not generated and presented to the user.

As a second example, the computing system can predict a travel route as discussed above and determine an estimated travel distance for the travel route. The estimated travel distance can then be compared to a travel distance threshold value to determine if the estimated travel distance exceeds the travel distance threshold value. The travel distance threshold value can be pre-set, set by the user, or based on other information as described above with respect to the travel time threshold value. For example, the predicted route can be a walking route. The computing system can use historic data on user behavior to determine that the user generally avoids walking trips greater than 1.5 miles. The computing system can use 1.5 miles as the travel distance threshold value. As another example, an average or weighted average of walking trips over an historic time period can be used to determine a travel distance threshold value for the user. The travel distance threshold value can be based, in part, on the predicted mode or modes of transportation for the predicted travel route. The computing system can determine that the suggestion 114 should be generated, transmitted to the computing device 100, and displayed in response to the computing system determining that the estimated travel distance exceeds the travel distance threshold value. If the estimated travel distance does not exceed the estimated travel distance threshold value, the suggestion 114 may not be generated and presented to the user.

As a third example, the computing system can predict a travel route as discussed above and determine an estimated travel cost for the travel route. For example, the computing system can perform an online search to determine an estimated cost of gas per gallon in the geographic area near the computing device 100, and estimate the amount of money in gas that would be used to travel to predicted route (or to travel the predicted route and then to the user's home or back to the user's current location). In some implementations, the estimated cost includes an estimated cost of parking at or near the physical store location. As another example, the predicted route can involve public transportation and the computing system can determine the estimated cost of traveling to the physical store location by public transportation, or determine the cost of a round trip to the physical store and back to the user's current location). As yet another example, the computing system can predict that the user will use a ride sharing service to travel to the physical store location. The computing system can compute the estimated cost of taking a ride share ride to the physical store location (or to the physical store location and then to a third location, such as the user's home, or the cost of a round trip ride share trip to the physical store location and back).

The estimated travel cost can then be compared to a travel cost threshold value to determine if the estimated travel cost exceeds the travel cost threshold value. The travel cost threshold value can be pre-set, set by the user, or based on other information as described above with respect to the travel time threshold value. For example, the computing system can use historic data on user behavior to determine that the user generally avoids trips that cost more than $8. The computing system can use $8 as the travel cost threshold value. As another example, an average or weighted average of trips by the user over an historic time period can be used to determine a travel cost threshold value for the user. As yet another example, the computing system can identify costs associated with purchasing products from an online store associated with the physical store location when determining the travel cost threshold value. For example, the system can predict one or more items that the user is likely to purchase from the identified physical store location. The computing system can then determine estimated shipping costs for those items (e.g., by querying the online store, or from stored past purchase information) and use the estimated shipping cost as the travel cost threshold value. As another example, the computing system can use historic or received information to determine an average shipping cost for orders from the online store associated with the physical store location. The average shipping cost can be used as the travel cost threshold value. As yet another example, the computing system can predict one or more items that the user is likely to purchase from the identified physical store location. The computing system can identify costs of the one or more items at the physical store location and costs of the one or more items at the online store. The computing system can determine if the cost of the items at the online store is more than the cost of the one or more items at the physical store location, and if the price at the online store is greater, the difference in cost can be used as the travel cost threshold value. In some instances, the difference in price can be added to an estimated shipping cost and this sum is used as the travel cost threshold value.

The computing system can determine that the suggestion 114 should be generated, transmitted to the computing device 100, and displayed in response to the estimated travel cost exceeding the travel cost threshold value. If the estimated travel cost does not exceed the estimated travel cost threshold value, the suggestion 114 is not generated and presented to the user.

As a fourth example, the computing system can identify a weather forecast for all or part of the predicted travel route. The computing system can then compare the weather forecast to determined criteria. In some implementations, the weather related criteria can be specific to the user. For example, the computing system can use information received from the user or historic user behavior information to identify that the user prefers to avoid driving in snowy conditions, rainy conditions, foggy conditions, dusty conditions, etc. The computing system can compare the predicted weather conditions along all or part of the predicted travel route to the determined criteria regarding the user's preference for avoiding particular types of inclement weather (or a preference for avoiding all types of inclement weather). If the weather prediction for all or part of the route matches a type of inclement weather which the computing system has identified as a type of inclement weather generally avoided by the user, the computing system determines that the suggestion 114 should be generated and presented to the user of the computing device 100.

In some implementations, predicted whether for all or part of the predicted travel route can be given a quantitative value which can be compared to a threshold weather value. For example, a rate of snow or rain can be predicted for all or part of the predicted travel route and compared to a threshold rain or snow rate value. The threshold value can be determined based on user preferences or observed historic user behavior. For example, the computing system can determine that the user generally prefers to avoid traveling under heavy rain conditions but does not avoid travel under mild rain conditions. The computing system can determine that the suggestion 114 should be generated and presented to the user in response to the computing system determining that the rate of snow or rain exceeds the threshold rain or snow rate value. As another example, the predicted weather value can be a total amount of rain or snow over a given time period which is then compared to a threshold value to determine if the suggestion 114 should be generated and displayed. As another example, a level of decreased visibility (due to rain, snow, fog, dust, etc.) can be identified and compared to a threshold value to determine if the suggestion 114 should be generated and displayed.

In some implementations, the computing system can determine that the suggestion 114 should be generated and displayed to the user whenever a particular weather condition is predicted to be present along or near the predicted route of travel at the time that the user is predicted to traverse the predicted route of travel. For example, predicted tornado, hurricane, or heavy thunderstorm conditions along the predicted travel route to the physical store location can cause the computing system to determine that the suggestion 114 should be generated and presented to the user of the computing device 100.

As a fifth example, the computing system can determine a time of day that the user is predicted to travel to the physical store location. For example, the computing system can determine that all or part of the predicted route of travel to the physical store location and the predicted route of travel to another location (either a different, third location, or back to the user's current location) is likely to occur after dark (or after the store has closed). The computing system can access user criteria (including information on historic user activity) to determine that the user generally prefers avoid traveling at night. The computing system can use this information to determine that the suggestion 114 should be generated and presented to the user if part of the travel to and from the physical store location is predicted to occur after dark (or if the store will be closed upon arrival).

As a sixth example, the computing system can predict traffic along the predicted travel route to the physical store location (and/or traffic along a travel route from the physical store location after the user has visited the physical store location). The predicted traffic estimate can, for example, be based on both current and historic traffic conditions for the predicted travel route. The predicted traffic along the travel route can be used in multiple ways. For example, the predicted traffic can be used in estimating a total travel time to (and/or from) the physical store location. The total travel time can be compared to a threshold travel time value as discussed above to determine if the suggestion 114 should be generated and displayed to the user. The predicted traffic along the predicted travel route can also be used as a metric to determine if the suggestion 114 should be generated and presented to the user separate from the total travel time. For example, traveling in heavy traffic can be highly frustrating even if the total travel time is equivalent to another route to a different location experiencing no traffic. For example, a 40 minute trip to travel 2 miles in heavy traffic can be very frustrating, while a 40 minute trip to travel 35 miles on an open highway is less frustrating to many users. The computing system can access identified user preferences or historic user behavior to determine if the user of the computing device 100 generally prefers to avoid traffic congestion.

In some implementations, the computing system can determine a threshold amount of traffic to compare to the predicted traffic to determine if the suggestion 114 should be generated and presented to the user. For example, user preference information and/or historic user behavior information can indicate that the user of the computing device 100 prefers to avoid heavy traffic conditions while the user does not mind mild or moderate traffic conditions. In some implementations, the computing system can quantize traffic conditions. For example, the computing system can identify the predicted rate of travel along all or a portion of the predicted travel route and compare that rate of travel to standard rates of travel along the route, or compare the predicted rate of travel to a rate of travel that would occur if all vehicles traveled at the speed limit. The difference in rate of travel can be used as a quantitative traffic measurement and compared to a traffic congestion threshold value to determine if the suggestion 114 should be generated and presented to the user. The traffic congestion threshold value can be based on user preferences or observed user historic behavior as described above. In some implementations, the suggestion 114 is generated and presented to the user in response to determining that the predicted traffic value exceeding the traffic congestion threshold value. As another example, if the predicted travel time for the predicted travel route exceeds a normal or standard travel time for the route, the amount by which the predicted travel time exceeds the normal or standard travel time can be compared to a threshold value to determine if the suggestion 114 should be generated and presented to the user.

As a seventh example, the computing system can identify one or more modes of transportation for the predicted travel route and compare this to user preference information (either elicited directly from the user, or based on observed historic user activity) to determine if the suggestion 114 should be generated and presented to the user. For example, the computing system can determine that the physical store location is not near a public transit route or near a public transit stop (e.g., not within reasonable walking distance of a public transit stop). The computing system can use the information indicating that the physical store location is not accessible by public transportation along with information indicating that the user prefers to avoid driving in favor of public transportation to determine that the suggestion 114 should be generated and presented to the user of the computing device 100. In some implementations, the user may not have access to a car and therefore may rely on public transportation exclusively. In such situations, computing system can determine that the suggestion 114 should be generated and presented to the user when the physical store location is not readily accessible by public transportation. As another example, the computing system can determine that parking near the physical store location is difficult and/or expensive. The computing system can access user preference information to determine that the user prefers driving and compare this to the information indicating that parking near the physical store location is difficult or expensive to determine that the suggestion 114 should be generated and presented to the user. In general, the computing system can determine that the suggestion 114 should be generated and presented to the user in response to the computing system determining that the user's preferred mode of transportation is not an available option or in response to the computing system determining that the only available modes of transportation to the physical store location are modes of transportation disfavored by the user.

In some implementations, particular aspects of a physical store location, a retailer associated with the physical store location, or particular products that are predicted to be purchased by the user can be used to determine if the suggestion 114 should be generated and presented to the user. For example, the computing system can predicted one or more items that the user is predicted to purchase at the physical store location. The computing system can determine an estimated time for delivery for the one or more items and compare this to a delivery time threshold value to determine if the suggestion 114 should be generated and presented to the user. The computing system can predict items that the user may be interested in purchasing based on observed user activity, such as online searches for product details performed by the user in the recent past. In some implementations, the delivery time threshold can be derived from user preference information or from past user activity information (e.g., past user activity indicates a preference for items that can be shipped in under two days).

In some implementations, past user activity is used to determine if the suggestion 114 should be generated and provided to the user of the computing device 100. For example, as described above, various past user activities can be used to determine a threshold criteria for comparing to identified aspects of the predicted travel route to determine if the suggestion 114 should be generated and provided to the user. For example, past user behavior can be used to identify a threshold travel time value, a threshold travel distance value, a threshold travel cost value, a threshold weather severity value, or a threshold traffic congestion severity value. Past user activities can also be used to identify criteria related to preferred mode(s) of transportation for the user. In some implementations, past user location information can be used to determine if the user frequently visits the physical store location or a geographic area around the physical store location. In some implementations, the suggestion 114 is generated and provided to the user in response to a determination that the user visits the physical store location or the geographic area around the physical store location at less than a threshold frequency.

In some implementations, various factors can be used as inputs into a machine learning model that determines if the user is likely to purchase an item from an online store that is associated with the physical store location. For example, a machine learning model can use inputs such as identification of previous visits to the physical store location, distance to the physical store location, estimated travel time to the physical store location, and available methods of transportation to the physical store location. The machine learning model can use the inputs to assign a percentage to the likelihood that the user will purchase one or more items from the online store. If the percentage exceeds a threshold percentage (e.g., greater than 50%) the suggestion 114 can be generated and presented to the user.

In some implementations, the computing system only presents the suggestion 114 to the user once the user has begun to travel toward the physical store location. For example, the computing system can use location information collected by the computing device 100 (e.g., GPS signals) to determine that the user has begun to drive toward the physical store location. As another example, the computing system can use position information for the computing device 100 to determine that the user has begun to walk towards a public transit stop for a public transit route the user is predicted to use to reach the physical store location. The computing system presents the suggestion 114 to the user in response to determining that the user has begun to travel to the physical store location. In some implementations, the computing system can identify times of day that the user generally performs certain activities. For example, the computing system can determine that the user generally leaves work at 5:00. The computing system can use this information to predict that the user will begin traveling to the physical store location at or shortly after 5:00. The computing system can use this information to present the suggestion 114 to the user at or shortly after 5:00 at a time that the user is determined to have begun traveling to the physical store location based on past user activity.

In some implementations, the computing system can compare multiple aspects of the predicted travel route, the physical store location, the retailer associated with the physical store location, the online store, or products available at the online store and/or physical store location to different determined criteria to determine if the suggestion 114 should be generated and presented to the user. For example, any of the above examples can be combined to determine if the suggestion 114 should be generated and presented to the user. In one particular example, the suggestion 114 can determine that the predicted travel time and the predicted mode of transportation satisfy determined criteria to trigger generation and presentation of the suggestion 114.

The computing system that includes the computing device 100 can increase efficiency, reduce use of communication resources (thereby freeing up communication resources for other purposes), reduce memory storage requirements, and reduce processing requirements by determining that the suggestion 114 should only be generated and presented to the user in response to determined criteria being satisfied. For example, by only generating and presenting the suggestion 114 if one or more determined criteria are satisfied (as described above), the total number of suggestions that are generated and communicated to users is decreased. This avoids using processing, memory, and communication resources by only using such resources when the computing system has determined that a particular user is likely to want to view a particular suggestion 114, rather than providing such suggestions to all users of a system and random or indiscriminate points in time. The solution presented here reduces the overall burden on the communications network, memory requirements for the computing system (including memory requirements for the computing device 100) and processing resources thereby freeing up these resources for use by other applications and for other purposes, and also increasing the ability to scale such a system to include a greater number of end user computing devices without increasing the capacity of the system.

In some implementations, the suggestion 114 is a customized suggestion that is generated specifically for the user of the computing device 100 and includes information that is specific to the user's current situation. For example, the suggestion 114 can include specific information relating to a predicted travel route to the physical store location; aspects of the physical store location, aspects of an identified online store, or aspects of particular items that the computing system has determined that the user may be interested in purchasing.

In the example depicted in FIG. 1A, the suggestion 114 includes an indication of the travel time to the physical store location (Joe's Hardware Place), an estimated travel cost for the trip to the physical store location ("$3.72"), an indication that the online store associated with Joe's Hardware Place provides free shipping, and an indication of specific items that can be purchased at the online store that the computing system has predicted that the user may be interested in.

Information that can be included in the suggestion 114 can include, for example, an estimated travel time to the physical store location (or to and from the physical store location), an estimated travel distance to the physical store location (or to and from the physical store location), an estimated travel cost to the physical store location (or to and from the physical store location), a suggested online store for a retailer of the physical store location, a suggested online store that sells products that are similar to products available at the physical store location, estimated shipping costs for one or more items that can be purchased at the online store, an estimated shipping time for one or more items, estimated cost or time savings that can be achieved by the user by purchasing one or more items from the online store rather than the physical store location, or other specific aspects of the predicted travel route, the physical store location, the online store, or predicted items of interest.

For example, the suggestion 114 can include an indication of predicted travel times to the physical store location by one or more different modes of travel and an amount of time that could be saved if the user purchases items online rather than traveling to the physical store location. As another example, the suggestion 114 can include one or more predicted costs of traveling to the physical store location and an estimated amount of money that can be saved by purchasing items from the online store rather than traveling to the physical store location. For example, the suggestion 114 can indicate a cost of traveling to the physical store location by car and a cost of traveling to the physical store location by public transportation. The suggestion 114 can further include an estimated cost of shipping one or more items that the computing system has determined are of interest to the user (or an average shipping cost for orders from the online store), and a cost savings calculated by subtracting the shipping costs from the cost of the cheapest predicted travel route.

As another example, the suggestion 114 can indicate that one or more modes of transportation are not available for reaching the physical store location. For example, the suggestion 114 can indicate that the physical store location cannot be reached by public transportation. As yet another example, the suggestion 114 can indicate that parking near the physical store location is difficult. As yet another example, the suggestion 114 can indicate an average cost of parking near the physical store location. As yet another example, the suggestion 114 can indicate traffic or weather conditions along all or part of the predicted travel route during a time that the user is predicted to traverse the predicted travel route.

In some implementations, the information included in the suggestion 114 is identified or determined by one or more remote servers of the computing system that includes the computing device 100 and the suggestion 114 is generated at the computing device 100. For example, one or more remote servers can identify the physical store location, identify a predicted travel route, identify an online store associated with a retailer of the physical store location, and determine information related to aspects of the physical store location, the predicted travel route, the online store, or items predicted to be of interest to the user. For example, the one or more remote servers can determine an estimated travel cost for the user to travel to the physical store location, estimated shipping costs for having predicted items delivered after purchase from the online store, an estimated savings by purchasing the items online, and a URL for the online store. The one or more remote servers can provide this information to the computing device 100 which can use this information to generate the suggestion 114. In some implementations, all or a portion of the suggestion 114 is generated at one or more remote servers and transmitted to the computing device 100 for presentation to the user.

In some implementations, the computing system that includes the computing device 100 generates and presents the suggestion 114 in response to determining that the user intends to travel to the identified physical store location sometime in the near future without receiving input from the user that expressly requests the suggestion. For example, after the user has entered the query 108 and selected "enter," the computing system can perform some or all of the above described processes to determine if the suggestion 114 should be generated and presented to the user. If the computing system determines that the suggestion 114 should be generated and presented (e.g., due to one or more determined criteria being satisfied) the computing system generates and presents the suggestion 114 on the display 102 without receiving additional user input. In some implementations, the computing system can perform some or all of the above described processes to determine if the suggestion 114 should be generated and presented to the user in response to the user requesting travel directions to the physical store location. If the computing system determines that the suggestion 114 should be generated and presented (e.g., due to one or more determined criteria being satisfied) the computing system generates and presents the suggestion 114 on the display 102 without receiving additional user input.

By generating the customized suggestion 114 only at the time that one or more determined criteria has been satisfied, the computing system reduces memory storage requirements. Rather than generating potentially millions of customized suggestions prior to times that the suggestions are to be presented to users, the computing system generates the customized suggestion 114 only at the time that computing system has determined that the customized suggestion 114 should be presented to the user of the computing device 100. This alleviates the need to store large quantities of pre-generated customized suggestions by generating the suggestions "on the fly" as they are needed for presentation to the user. Thus, the system described herein saves memory storage resources which are then freed up for use by other applications and for other purposes.

Figure 2:
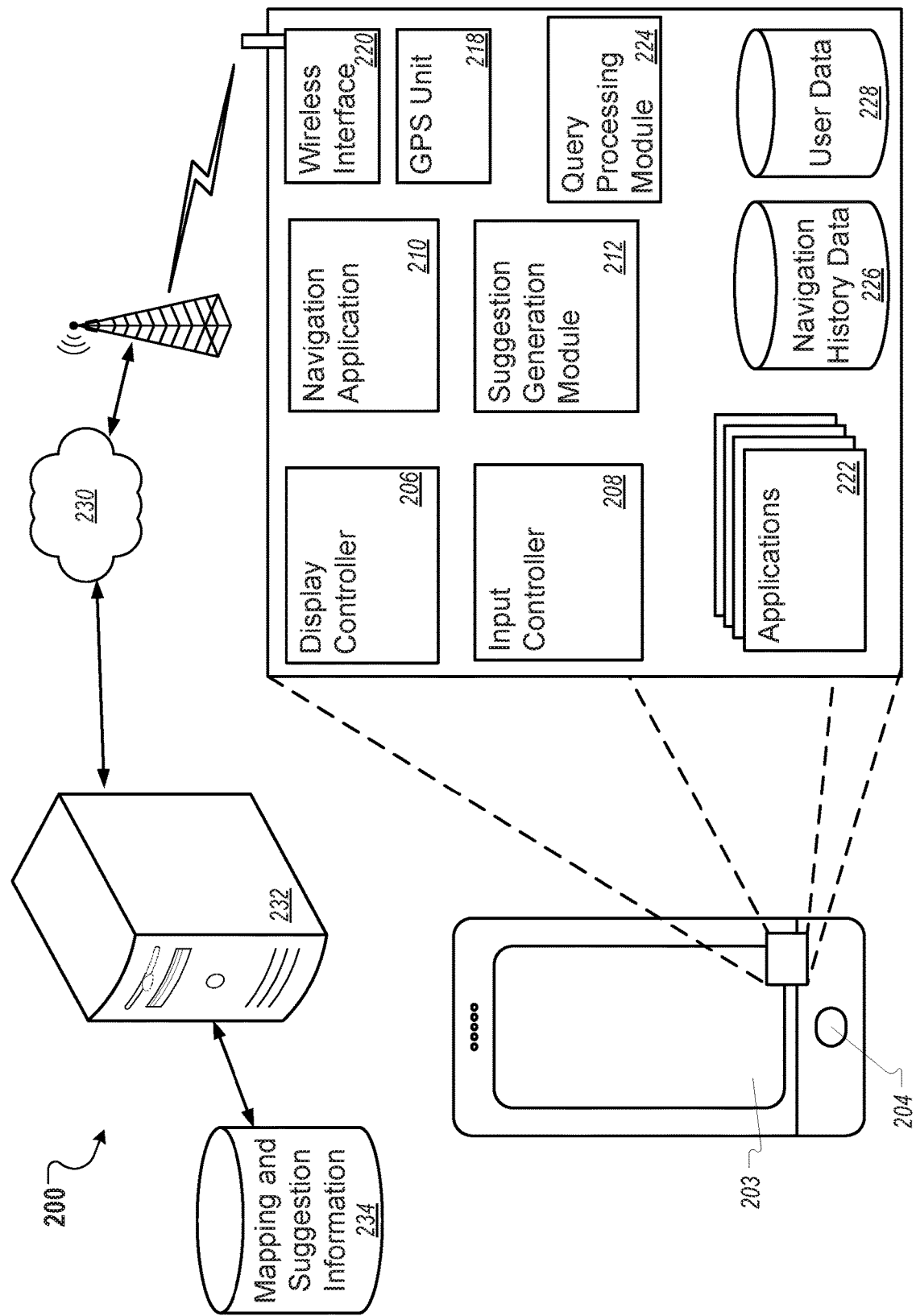
FIG. 2 is a schematic diagram of a system for interacting with a user by way of a suggestion generation module on a mobile device.

Referring now to FIG. 2, in accordance with some implementations, a communications system 200 includes a mobile device 202. In some implementations, the mobile device 202 can be the same as the computing device 100 or can be configured to perform functions that are similar to those described above with respect to the computing device 100. In the example shown, the mobile device 202 is a cellular phone. In other implementations, the mobile device 202 can be a personal digital assistant, a laptop computer, a net book, a camera, a wrist watch, or another type of mobile electronic device. The mobile device 202 includes a display screen 203 for displaying text, images, and graphics to a user, including displays generated by one or more applications running on the mobile device 202. In some implementations, the display screen 203 is a touch screen for receiving user input. For example, a user contacts the display screen 203 using a finger or stylus in order to select items displayed by the display screen 203, enter text, or control functions of the mobile device 202. The mobile device 202 further includes one or more input keys such as a button 204 for receiving user input. For example, the button 204 can be used to make selections, return to a home screen, or control functions of the mobile device 202. As another example, the one or more input keys includes a click wheel or track ball for scrolling through menus and text.

The mobile device 202 includes a number of modules for controlling functions of the mobile device 202. The modules can be implemented using hardware, software, or a combination of the two. The mobile device 202 includes a display controller 206, which may be responsible for rendering content for presentation on the display screen 203. The display controller 206 may receive graphic-related content from a number of sources and may determine how the content is to be provided to a user. For example, a number of different windows for various applications 222 on the mobile device 202 may need to be displayed, and the display controller 206 may determine which to display, which to hide, and what to display or hide when there is overlap between various graphical objects. The display controller 206 can include various components to provide particular functionality for interacting with displayed components, which may be shared across multiple applications, and may be supplied, for example, by an operating system of the mobile device 202.

An input controller 208 may be responsible for translating commands provided by a user of mobile device 202. For example, such commands may come from a keyboard, from touch screen functionality of the display screen 203, from button 204, or from other such sources, including dedicated buttons or soft buttons (e.g., buttons whose functions may change over time, and whose functions may be displayed on areas of the display screen 203 that are adjacent to the particular buttons). The input controller 208 may determine, for example, in what area of the display commands are being received, and thus in what application being shown on the display the commands are intended for. In addition, it may interpret input motions on the touch screen 203 into a common format and pass those interpreted motions (e.g., short press, long press, flicks, and straight-line drags) to the appropriate application. The input controller 208 may also report such inputs to an event manager (not shown) that in turn reports them to the appropriate modules or applications. For example, a user viewing an options menu displayed on the display screen 203 selects one of the options using one of the track ball 204 or touch screen functionality of the mobile device 202. The input controller 208 receives the input and causes the mobile device 202 to perform functions based on the input.

A variety of applications 222 may operate, generally on a common microprocessor, on the mobile device 202. The applications 222 may take a variety of forms, such as mapping applications, e-mail and other messaging applications, image viewing and editing applications, video capture and editing applications, web browser applications, music and video players, and various applications running within a web browser or running extensions of a web browser.

A wireless interface 220 manages communication with a wireless network, which may be a data network that also carries voice communications. The wireless interface 220 may operate in a familiar manner, such as according to the examples discussed below, and may provide for communication by the mobile device 202 with messaging services such as text messaging, e-mail, and telephone voice mail messaging. In addition, the wireless interface 220 may support downloads and uploads of content and computer code over a wireless network. The wireless interface also supports transmission and reception of information used by various applications 222 and other programs and modules running on the mobile device 202.

The mobile device 202 further includes a navigation application 210. The navigation application 210 can display information and images associated with locations within relative proximity of the mobile device 202 such as maps, satellite images, and street level images for locations near the mobile device 202 (or for locations identified by a user of the mobile device 202). The navigation application 210 can cause the mobile device 202 to display information on locations of interest near the location of the mobile device 202 (or in a geographic area indicated by the user of the mobile device 202) such as businesses, recreation areas, parks, government facilities, etc. Such information can include indications of locations of interest on a map or satellite image of a geographic region.

The mobile device 202 further includes a suggestion generation module 212. The suggestion generation module 212 can generate custom suggestions for presentation to the user. The custom suggestions can include information that is specific to a user's current situation as well as information related to predicted future actions by the user (such as a predicted desire by the user to travel to a physical location, such as a physical store location in the near future). The suggestion generation module 212 can be part of the navigation application 210, a separate application that operates in conjunction with the navigation application 210, or a separate application that does not interact with the navigation application 210. In some implementations, the suggestion generation module 212 generates suggestions, such as, for example, the suggestion 114 discussed with respect to FIG. 1B. The suggestion generation module 212 can generate suggestions that include information related to physical store locations, predicted travel routes to physical store locations, identified online stores that are associated with physical store locations or sell items similar to those available at identified physical store locations, or information associated with items that may be of interest to the user of the mobile device 202. In some implementations, the suggestion generation module 212 generates suggestions in response to one or more determined criteria being satisfied. For example, the suggestion generation module 212 can compare aspects of a predicted route of travel to a physical store location or aspects related to an online store, a physical store location, or identified items of interest to determined criteria to determine if one or more custom suggestions should be generated.

Still referring to FIG. 2, in accordance with some implementations, the navigation application 210 uses a GPS Unit 218 of the mobile device 202 to determine the location of the mobile device 202. For example, the GPS Unit 218 receives signals from one or more global positioning satellites. The GPS Unit 218 uses the signals to determine the current location of the mobile device 202. In some implementations, rather than the GPS Unit 218, the mobile device 202 includes a module that determines a location of the mobile device 202 using transmission tower triangulation or another method of location identification. In some implementations, the mobile device 202 uses location information that is determined using the GPS Unit 218 to identify geo-coded information that is associated with the location of the mobile device 202. In such implementations, location information obtained or determined by the GPS Unit 218 is provided to the navigation application 210. In some implementations, the navigation application 210 stores location information provided by the GPS Unit 218 as navigation history data 226 stored on the mobile device 202.

The navigation history data 226 can include information associated with particular geographic locations that the user of the mobile device 202 has traveled to (including particular geographic locations that the user visits on a regular basis), past travel routes the user has traversed (including preferred and frequented travel routes), past modes of transportation (including preferred modes of transportation for the user, travel times (e.g., times of day the user generally travels) and other location and navigation information. The navigation application 210 and or suggestion generation module 212 can use the navigation history data 226 to predict if/when a user is likely to travel to a particular physical location, to determine if one or more suggestions for alternative activities should be generated and presented to the user, and to identify information to include in custom suggestions. In some implementations, the navigation history data 226 is stored on a memory of the mobile device 202, such as a hard drive, flash drive, or SD card. In some implementations, the mobile device 202 may contain no pre-stored navigation history data.

Still referring to FIG. 2, in accordance with some implementations, the suggestion generation module 212 can use user data 228 stored on the mobile device 202 to identify user preferences. The user data 228 can be used, for example, to identify a physical location that the user is likely to travel to in the near future, preferred modes of transportation for the user, preferred routes of transportation for the user, items of interest that the user may be interested in purchasing, and other information that can be used to determine if a suggestion should be generated and what information to include in the suggestion. In some implementations, the user data 228 includes indications of user preferences. For example, historical searching data associated with a user of the mobile device 202 may indicate that the user has an interest in fishing and outdoor recreation. This information can be used to identify a particular location that a user is traveling toward when the user is traveling to a particular geographic region. For example, if it is determined that the user is traveling toward a particular shopping area, the preference information can be used to determine that the user is likely headed to a fishing and camping store in the shopping area. As another example, the user data 228 may indicate a historical preference for Italian food. This information can be used to indicate that the user is likely headed to an Italian restaurant when the user is headed toward an area that includes a plurality of restaurants.

In some implementations, the navigation application 210 and/or the suggestion generation module 212 uses the wireless interface 220 to obtain navigation history data and/or user data from a remote server 232 through a network 230. For example, the navigation history data 226 and the user data 228 can be stored at the remote server 232.

In some implementations, some or all of the functions of the suggestion generation module 212 are performed at one or more remote servers, such as at the remote server 232. In such implementations, navigation application 210 provides the current location of the mobile device 202 along with information indicating a desire by the user to travel to a particular location (such as a physical store location) to the wireless interface 220 which in turn transmits the information to the remote server 232 through the network 230. The remote server 232 can use the information received from the mobile device 202 along with other information to predict that a user is likely to travel to a physical location (such as a physical store location), to determine if a suggestion for an alternative action should be generated and provided to the user of the mobile device 202, and to identify information to include in such a suggestion.

The remote server 232 accesses a database of mapping and suggestion information 234 to identify information that can be used to predict that a user is likely to travel to one or more particular locations in the near future, and to determine if a customized suggestion should be generated and presented to the user. In some implementations, the database of mapping and suggestion information 234 is a series of databases and information sources that can be accessed by the remote server 232. The remote server 232 can use the information contained in the database of mapping and suggestion information 234 to predict that a user is likely to travel to a physical location (such as a physical store location), to determine if a suggestion for an alternative action should be generated and provided to the user of the mobile device 202, and to identify information to include in such a suggestion.

For example, the mobile device 202 can include a query processing module 224 for processing queries entered into the mobile device 202. The query processing module 224 can receive queries from the user of the mobile device 202 using the input controller 208, for example. In some implementations, queries are received in conjunction with the navigation application. For example, the user of the mobile device 202 can enter a query for a store having a particular name, for a particular park, or for a particular category of store. In some implementations, the query processing module 224 can be part of the navigation application 210. The query processing module 224 communicates the query to the remote server 232 through the network 230 using the wireless interface 220. The remote server 232 can use information included in the database of mapping and suggestion information 234 to resolve the query. For example, the remote server 232 can use the information in the database of mapping and suggestion information 234 to identify a physical location for a store having a store name identified in a query entered by the user of the mobile device 202. The remote server 232 can also use information from the database of mapping and suggestion information 234 as well as information received from the mobile device 202 to predict that the user is likely to travel to a particular location sometime in the near future using other techniques other than resolving a query.

The remote server 232 can also use information in the database of mapping and suggestion information 234 to determine a predicted route of travel to the identified physical location as well as various aspects of the predicted route of travel to the physical location. The remote server 232 can also determine if the physical location is associated with an online store, or if another entity has an online store that sells products or services similar to those available at the physical location. If the physical location is associated with an online store or if another online store sells products or services similar to those available at the physical location, the remote server 232 can use other information gathered from the database of mapping and suggestion information 234 or from other sources to determine if a custom suggestion for an alternate activity (such as a suggestion to purchase items online rather than visit the physical location) should be generated and displayed to the user of the mobile device 202.

The remote server 232 can compare various aspects of the physical location, the predicted route of travel to the physical location, the online store, or potential items of interest to the user to various determined criteria to determine if a custom suggestion should be generated and presented to the user. For example, the remote server 232 can perform various processes for determining if one or more determined criteria are satisfied such as those described with respect to FIGS. 1A-1B.

The remote server 232 can gather information to include in suggestions including information related to physical store locations, predicted travel routes to physical store locations, identified online stores that are associated with physical store locations or sell items similar to those available at identified physical store locations, or information associated with items that may be of interest to the user of the mobile device 202. This information can be gathered from the database of mapping and suggestion information 234 and/or other sources of information. In some implementations, the remote server 232 can gather information to include in a suggestion and provide the information to the mobile device 202 through the network 230. The suggestion generation module 212 can use the provided information to generate a suggestion for presentation to the user.

Information that can be gathered by the remote server 232 an provided to the suggestion generation module 212 for inclusion in suggestions presented to the user of the mobile device 202 can include, for example, an estimated travel time to the physical location (or to and from the physical location), an estimated travel distance to the physical location (or to and from the physical store location), an estimated travel cost to the physical location (or to and from the physical store location), traffic or weather conditions along the predicted route, methods of transportation that are available for reaching the physical location, a suggested online store for a retailer associated with the physical location, a suggested online store that sells products or services that are similar to products or services available at the physical location, estimated shipping costs for one or more items that can be purchased at the online store, an estimated shipping time for one or more items, estimated cost or time savings that can be achieved by the user by purchasing one or more items from the online store rather than the physical store location, or other specific aspects of the predicted travel route, the physical store location, the online store, or predicted items of interest. The information can be used by the suggestion generation module 212 to generate a custom suggestion for presentation to the user of the mobile device 202.

Figure 3A:
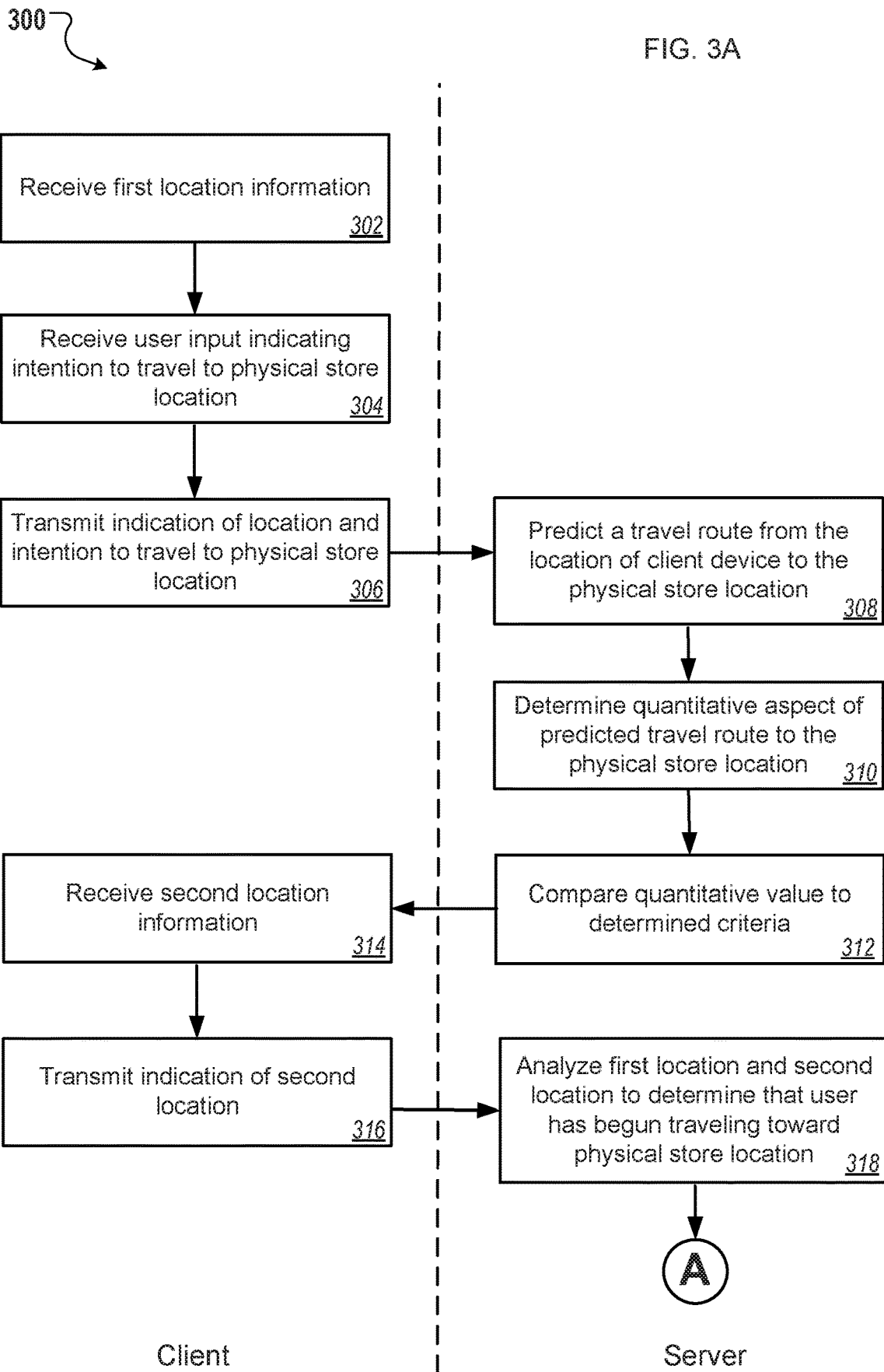
FIGS. 3A-3B show a flow diagram of actions taken in a system for providing custom content to a user.
Figure 3B:
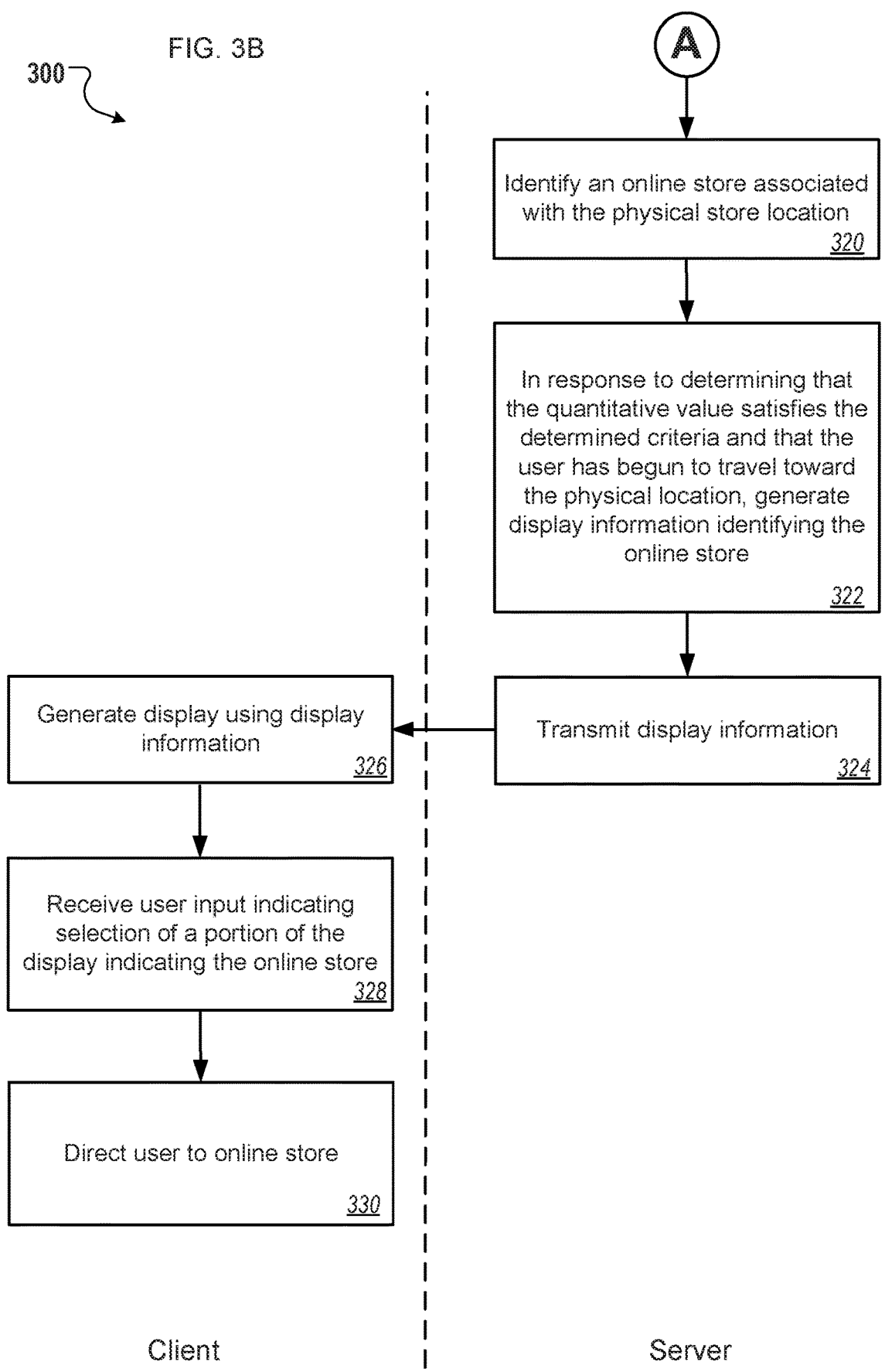

FIGS. 3A-3B show a flow diagram for a process 300 for providing custom content to a user of a computing system. The flow diagram shows various actions performed by a client device and a remote server system and communications between the client device and the server system. In some implementations, the client and/or the server can be implemented as multiple computing devices. For example, the server system can be multiple servers in communication with each other performing various tasks.

At box 302, the client device receives first location information. For example, the client device can receive GPS signals indicating a location of the client device. As another example, the client device uses cellular tower triangulation to determine a location of the client device. As yet another example, a network access device, such as a router or WiFi modem can provide information that is used to identify the location of the client device.

At box 304, the client device receives user input indicating an intention to travel to a physical store location. For example, the user of the client device can open a mapping or navigation application on the client device and enter a query for a particular store name (e.g., "Harold's Food Shack") or a particular store type ("pool supply store"). The query information can be used to determine that the user intends to travel to a particular physical store location (e.g., in the near future). This determination can be performed either at the client device or at the server system. As another example, the client device can receive user input in the form of detected movement of the client device (e.g., based on changing location information) and use this information along with historic user information to determine that the user is moving in the direction of a particular store location and therefore intends to travel to the particular store location. For example, if the user often visits a particular running gear store, information received by the client device indicating that the user is traveling toward the running gear store along with historic information indicating that the user often travels to the running gear store can be used to determine that the user is likely traveling toward the running gear store. This determination can be performed either at the client device or at the server system.

At box 306, the client device transmits the indication of location of the client device and the indication of the intention to travel to the physical store location to the server system. This can be performed over a communications network using a communications interface of the client device, such as the wireless interface 220 discussed with respect to FIG. 2.

Returning to FIG. 3A, at box 308, the server system predicts a travel route from the location of the client device to the physical store location. For example, the server system can use the information indicating an intention of the user to travel to the physical store location to determine that the user intends to travel to the physical store location in the near future. The server system can then predict one or more routes of travel that the user may take to reach the physical store location. For example, the server system can access a mapping service which uses the user's current physical location and an address for the physical store location to identify a quickest travel route to the physical store location. In some implementations, information on user preferences, such as user preferences for a particular mode of transportation over other modes of transportation (e.g., a preference for public transit, or a preference for ride sharing services) to predict the travel route. In some implementations, information such as predicted or current traffic or weather conditions can be used to determine a fastest route of travel to the physical store location.

At box 310, the server system determines a quantitative aspect of the predicted travel route to the physical store location. For example, the server system can determine an estimated travel distance, an estimated travel time, an estimated travel cost (e.g., public transit fare costs, gas costs, parking costs, etc.), estimated amount or rate of rain, estimated amount or rate of snow, estimated visibility level, estimated traffic severity (e.g., as measured by predicted or current travel times compared to baseline travel times), or other quantitative aspect of the predicted travel route to the physical store location. In some implementations, multiple quantitative aspects of the predicted travel route to the physical store location are determined by the server system.

At box 312, the server compares the determined quantitative value to a determined criteria. The determined criteria can be, for example, a travel time threshold value, a travel distance threshold value, a travel cost threshold value, a weather condition severity threshold value, or a traffic severity threshold value. For example, the server system can set a travel time threshold value of 30 minutes. The determined travel time estimate for the predicted travel route can be compared to the travel time threshold value of 30 minutes to see if the estimated travel time satisfies the travel time threshold value by being equal to or longer than 30 minutes.

In some implementations, the determined criteria is determined from preference information (e.g., user preference information) or historically observed user activity. For example, the user can indicate a preference to avoid snowfall greater than a particular severity. The server system can compare estimated snowfall rate or amount for the predicted travel route to the identified preference to see if the preference is satisfied. As another example, information on past user activities can be used to determine that the user often avoids taking trips that are longer than 45 minutes. This information can be used to set a travel time threshold value of 45 minutes. As another example, past user activity information can be used to identify that the user generally avoids trips that cost more than $8. This information can be used to set a travel cost threshold value of $8.

At box 314, second location information is received by the client device. The second location information can be, for example, GPS signals indicating a location of the client device. The second location information indicates the location of the client device at a second point in time that is later than the point in time that the first location information was received.

At box 316, the client device transmits an indication of the second location indicated by the second location information to the server system. For example, the information transmitted can be an indication of a location on a map, an indication of an address, latitude and longitude information, or other location information derived from the received second location information.

At box 318, the server system analyzes the first location and second location to determine that the user has begun traveling toward the physical store location. For example, the server system can analyze the first and second locations to determine that the second location is closer to and in the direction of the physical store location when compared to the first location. The server system can also identify time stamp information associated with the first and second locations to determine a rate of travel of the user of the client device. This rate of travel can then be used to determine a mode of travel being utilized by the user, such as driving or walking. As another example, the first and second location information can be used to determine that the user is walking toward a transit stop for a transit route of a predicted route of travel to the physical store location.

Continuing in FIG. 3B, at box 320, the server system identifies an online store associated with the physical store location. For example, the server system can identify a webpage for an online store that is run by the owner of the physical store location. As another example, the physical store location can be a franchise location of a corporate chain of stores and the server system can identify an online store for the chain of stores. For example, the server system can identify a webpage or website that allows users to purchase items for home delivery.

At box 322, the server system generates display information identifying the online store in response to determining that the quantitative value satisfies the determined criteria (e.g., and also that the user has begun to travel toward the physical store location). For example, the server system only generates information to include in a custom suggestion for the user of the client device if the user is determined to have started traveling to the physical store location and only if one or more aspects of the predicted route of travel to the physical store location satisfies a determined criteria. For example, in some implementations, the server system will only generate the display information if the estimated travel time for the predicted route of travel exceeds an identified travel time threshold value. In another example implementation, the server system will only generate the display information if the estimated travel cost for the predicted route of travel to the physical store location exceeds an estimated cost of having one or more identified items delivered to the user. For example, the server system can predict one or more items available at the physical store location that may be of interest to the user. The server system can estimate shipping costs to have the items delivered to the user and compare these shipping costs to the estimated travel costs for the predicted travel route to determine if the cost of traveling to the physical store location exceeds the estimated shipping costs.

The display information can include information to include in a suggestion to be presented to the user. The suggestion can be a suggestion to engage in another activity, such as purchasing items online, rather than traveling to the physical store location. The display information can include, for example, an estimated travel time to the physical store location (or to and from the physical store location), an estimated travel distance to the physical store location (or to and from the physical store location), an estimated travel cost to the physical store location (or to and from the physical store location), traffic or weather conditions along the predicted route, methods of transportation that are available for reaching the physical store location, information for the online store (such as a webpage URL), estimated shipping costs for one or more items that can be purchased at the online store, an estimated shipping time for one or more items, estimated cost or time savings that can be achieved by the user by purchasing one or more items from the online store rather than the physical store location, or other specific aspects of the predicted travel route, the physical store location, the online store, or predicted items of interest.

At box 324, the server system transmits the display information to the client device. The display information can be used in generating a suggestion for presentation to the user of the client device.

At box 326, the client device generates a display using the display information. The display can be, for example, a suggestion that the user visit the online store rather than travel to the physical store location. The display can also include information particular to the predicted route of travel, such as an estimated distance, time, or cost of travel to the physical store location. The display can also include information on weather or traffic conditions along the predicted travel route. The display can also include information on items available on the online store, estimated shipping and other costs associated with purchasing items from the online store, a name of the online store, a URL of the online store, or other information on the online store.

At box 328, the client device receives user input indicating selection of a portion of the display indicating the online store. The selection can select a hyper link that directs to a URL for a webpage of the online store. The selection can be received, for example, using touch screen functionality of the client device, by input mechanisms that allow the user to control a cursor and select the indication of the online store, or by selection of other inputs such as a soft key associated with an indication of the online store.

At box 330, upon selection of the portion of the display indicating the online store, the client device directs the user to the online store. This can include contacting a webserver identified by a URL for the online store to receive a webpage for the online store and then presenting the webpage to the user in a browser executing on the client device.

In some implementations, various portions of the process 300 can be performed in a different order than that shown. For example, the online store associated with the physical store location can be identified prior to comparing the quantitative value to the determined criteria. As another example, the client device can transmit the indication of the second location to the server system prior to the server system determining that quantitative aspect of the predicted travel route to the physical store location (for example, the indication of the second location can be transmitted along with the indication of the first location). In some implementations, portions of the process 300 indicated as being performed by a particular device or system (e.g., the client device or the server system) can be performed by a different device or system. For example, the client device can predict the travel route from the location of the client device to the physical store location and can determine the quantitative aspect of the predicted travel route to the physical store location.

Figure 4:
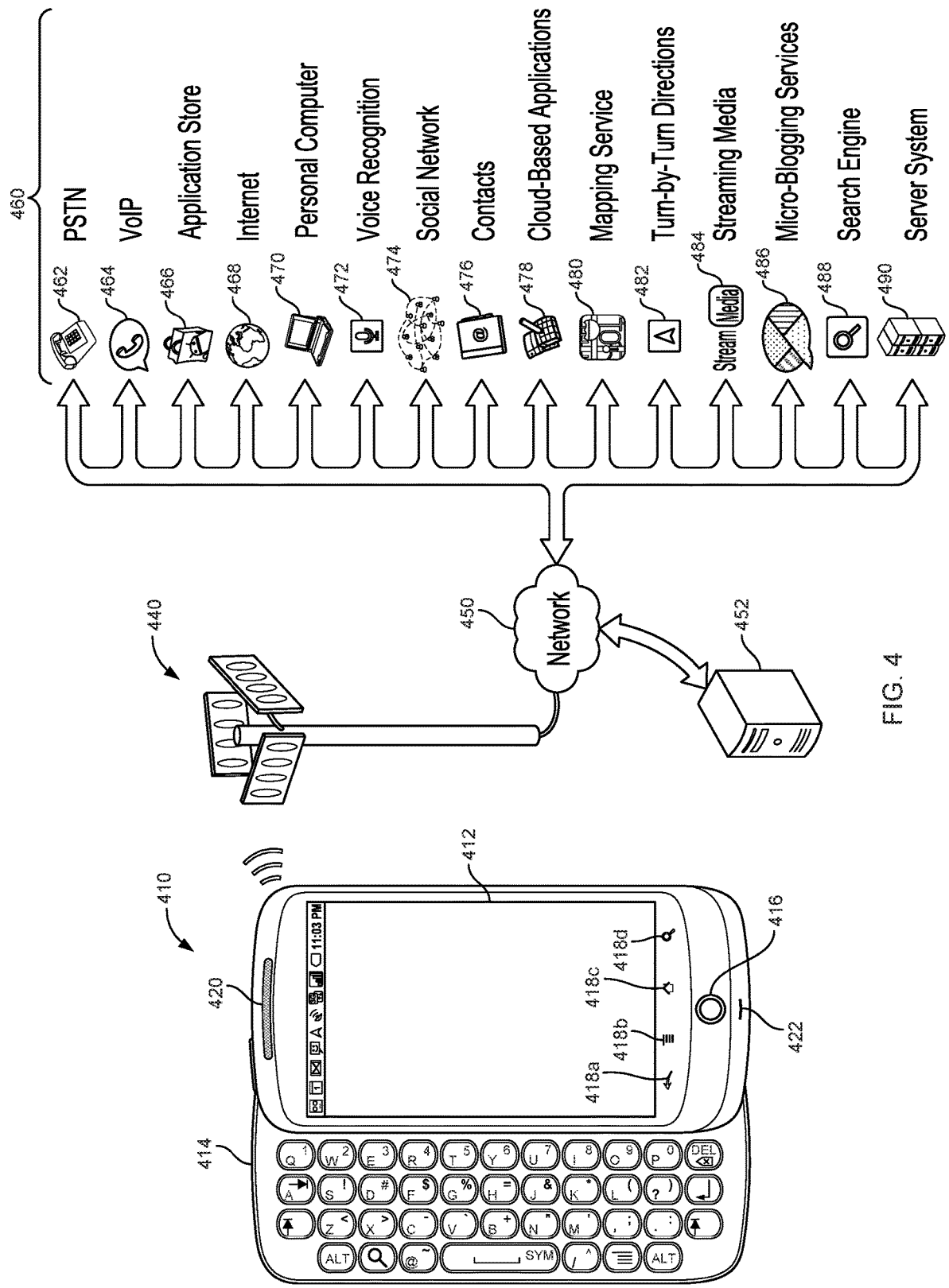
FIG. 4 is a conceptual diagram of a system that may be used to implement the systems and methods described in this document.

Referring now to FIG. 4, a conceptual diagram of a system that may be used to implement the systems and methods described in this document is illustrated. In the system, mobile computing device 410 can wirelessly communicate with base station 440, which can provide the mobile computing device wireless access to numerous hosted services 460 through a network 450.

In this illustration, the mobile computing device 410 is depicted as a handheld mobile telephone (e.g., a smartphone, or an application telephone) that includes a touchscreen display device 412 for presenting content to a user of the mobile computing device 410 and receiving touch-based user inputs. Other visual, tactile, and auditory output components may also be provided (e.g., LED lights, a vibrating mechanism for tactile output, or a speaker for providing tonal, voice-generated, or recorded output), as may various different input components (e.g., keyboard 414, physical buttons, trackballs, accelerometers, gyroscopes, and magnetometers).

Example visual output mechanism in the form of display device 412 may take the form of a display with resistive or capacitive touch capabilities. The display device may be for displaying video, graphics, images, and text, and for coordinating user touch input locations with the location of displayed information so that the device 410 can associate user contact at a location of a displayed item with the item. The mobile computing device 410 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 414, which may be a full qwerty keyboard or a traditional keypad that includes keys for the digits '0-9', '*', and '#.' The keyboard 414 receives input when a user physically contacts or depresses a keyboard key. User manipulation of a trackball 416 or interaction with a track pad enables the user to supply directional and rate of movement information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, IOS, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" graphical user interface that is displayed after turning on the mobile computing device 410, after activating the mobile computing device 410 from a sleep state, after "unlocking" the mobile computing device 410, or after receiving user-selection of the "home" button 418c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 410 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 410 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 410. The mobile device 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., ETHERNET, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computing systems that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing systems associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call using a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 5:
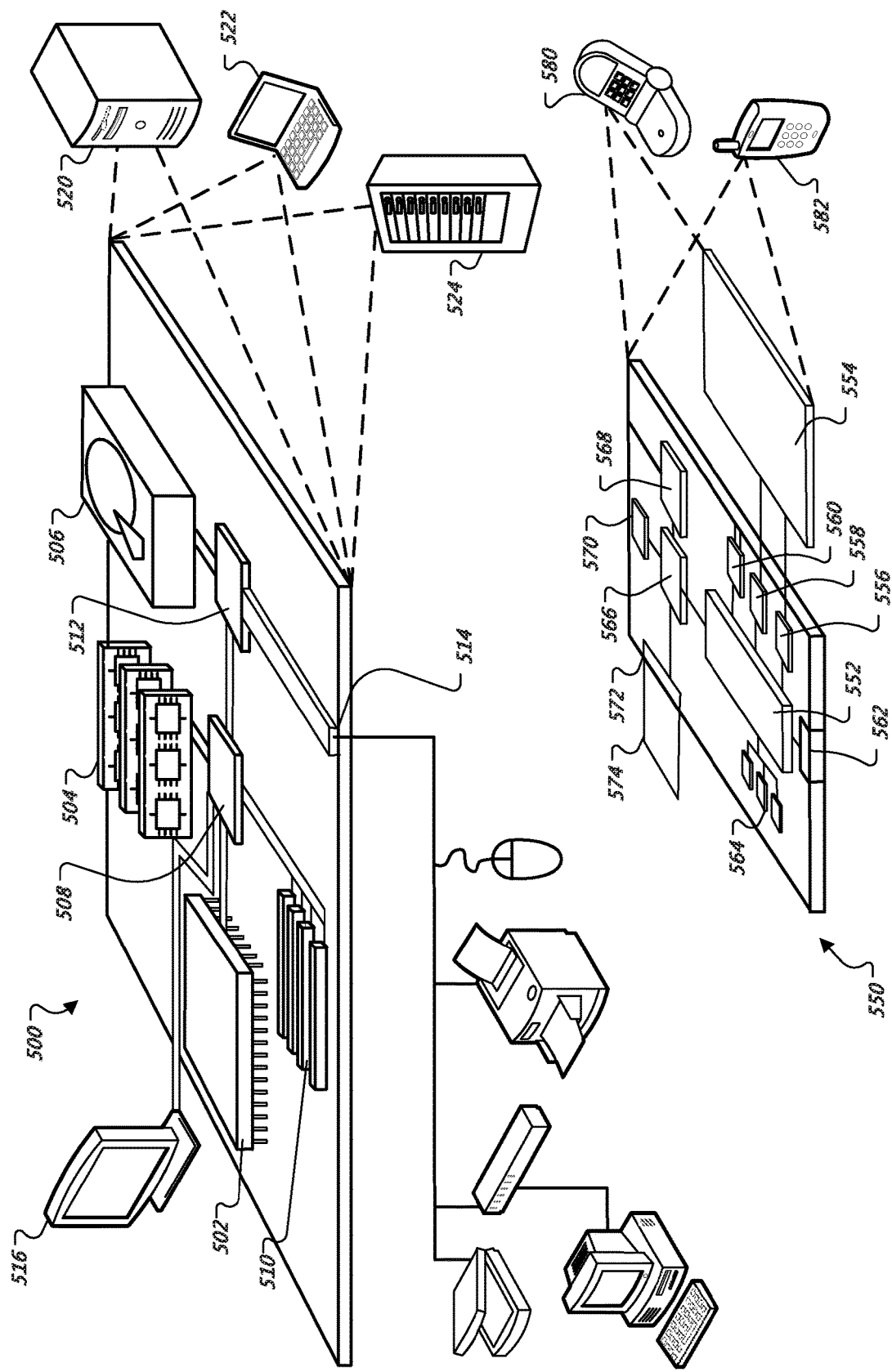
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high-speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high-speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provided, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer implemented method comprising:
receiving, from a mobile computing device, information indicating that a user of the mobile computing device intends to travel to a physical venue;
identifying, a first location of the mobile computing device;
determining an estimated travel time from the first location of the mobile computing device to the physical venue;
comparing the estimated travel time to a user-specific trip travel time threshold that indicates a maximum amount of time that the user of the mobile computing device prefers to travel;
determining that the estimated travel time meets or exceeds the user-specific trip travel time threshold, and in response, generating display information for presentation to the user at the mobile computing device, the display information including a selectable control that, when selected, causes the mobile computing device to access an online resource that is determined to be associated with the physical venue or that is determiend to offer at least one product for sale corresponding to at least one product offered for sale at the physical venue;
causing the mobile computing device to present the display information for the user.

2. The method of claim 1, wherein the display information is displayed as part of a map display, the map display including an indication of a location of the physical venue.

3. The method of claim 1, wherein the display information further includes an indication of an estimated travel cost for traveling from the first location to the physical venue.

4. The method of claim 3, wherein the display information includes an indication of an estimated shipping cost for having one or more products delivered.

5. The method of claim 1, wherein the display information is displayed by the mobile computing device in response to a determination that the user has begun to travel to the physical venue.

6. The method of claim 1, wherein the display information includes an indication of one or more products available for purchase at the online resource.

7. The method of claim 1, further comprising:
accessing historic user activity information for the user;
determining, using the historic user activity information for the user, an average travel time for trips taken by the user; and
setting the determined average travel time as the user-specific trip travel time threshold prior to comparing the estimated travel time to the user-specific trip travel time threshold.

8. The method of claim 1, further comprising:
accessing historic user activity information for the user;
determining, using the historic user activity information for the user, an average travel time range for trips taken by the user; and
setting the maximum value of the determined average travel time range as the user-specific trip travel time threshold prior to comparing the estimated travel time to the user-specific trip travel time threshold.

9. The method of claim 1, wherein the user-specific trip travel time threshold is determined based on historic user activity information, including information on past trips taken by the user.

10. The method of claim 1, wherein the user-specific trip travel time threshold is determined based on user preference information provided by the user.

11. A tangible, non-transitory recordable medium having recorded thereon instructions, that when executed, cause performance of actions that comprise:
receiving, from a mobile computing device, information indicating that a user of the mobile computing device intends to travel to a physical venue;
identifying, a first location of the mobile computing device;
determining an estimated travel time from the first location of the mobile computing device to the physical venue;
comparing the estimated travel time to a user-specific trip travel time threshold that indicates a maximum amount of time that the user of the mobile computing device prefers to travel;
determining that the estimated travel time meets or exceeds the user-specific trip travel time threshold, and in response, generating display information for presentation to the user at the mobile computing device, the display information including a selectable control that, when selected, causes the mobile computing device to access an online resource that is determined to be associated with the physical venue or that is determined to offer at least one product for sale corresponding to at least one product offered for sale at the physical venue;
causing the mobile computing device to present the display information for the user.

12. The recordable medium of claim of claim 11, wherein the display information is displayed as part of a map display, the map display including an indication of a location of the physical venue.

13. The recordable medium of claim of claim 11, wherein the display information further includes an indication of an estimated travel cost for traveling from the first location to the physical venue.

14. The recordable medium of claim of claim 13, wherein the display information includes an indication of an estimated shipping cost for having one or more products delivered.

15. The recordable medium of claim of claim 11, wherein the display information is displayed by the mobile computing device in response to a determination that the user has begun to travel to the physical venue.

16. The recordable medium of claim of claim 11, wherein the display information includes an indication of one or more products available for purchase at the online resource.

17. The recordable medium of claim of claim 11, the actions further comprising:
accessing historic user activity information for the user;
determining, using the historic user activity information for the user, an average travel time for trips taken by the user; and setting the determined average travel time as the user-specific trip travel time threshold prior to comparing the estimated travel time to the user-specific trip travel time threshold.

18. The recordable medium of claim of claim 11, the actions further comprising:
accessing historic user activity information for the user;
determining, using the historic user activity information for the user, an average travel time range for trips taken by the user; and
setting the maximum value of the determined average travel time range as the user-specific trip travel time threshold prior to comparing the estimated travel time to the user-specific trip travel time threshold.

19. The recordable medium of claim of claim 11, wherein the user-specific trip travel time threshold is determined based on historic user activity information, including information on past trips taken by the user.

20. The recordable medium of claim of claim 11, wherein the user-specific trip travel time threshold is determined based on user preference information provided by the user.

* * * * *